United States Patent
Bauer et al.

(10) Patent No.: US 11,460,832 B2
(45) Date of Patent: Oct. 4, 2022

(54) OBJECT TRACKING-BASED CONTROL OF MANUFACTURING PROCESSES IN THE METALWORKING INDUSTRY

(71) Applicant: TRUMPF Werkzeugmaschinen GmbH + Co. KG, Ditzingen (DE)

(72) Inventors: Klaus Bauer, Ditzingen (DE); Christian Bauer, Karlsruhe (DE); Manuel Beuttler, Leonberg (DE); Hans-Peter Bock, Bietigheim-Bissingen (DE); Daniel Bossert, Nussdorf (DE); Marcel Ely Gomes, Stuttgart (DE); Stephan Fischer, Ditzingen (DE); Christian Goerg, Moeglingen (DE); Manuel Kiefer, Sinsheim (DE); Thorsten Larsen-Vefring, Stuttgart (DE); Frank Perdana, Wiernsheim (DE); Zaigham Faraz Siddiqui, Boeblingen (DE); Eberhard Wahl, Weilheim (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 344 days.

(21) Appl. No.: 16/815,456

(22) Filed: Mar. 11, 2020

(65) Prior Publication Data
US 2020/0209836 A1    Jul. 2, 2020

Related U.S. Application Data

(63) Continuation of application No. PCT/EP2018/071161, filed on Aug. 3, 2018.

(30) Foreign Application Priority Data

Sep. 12, 2017    (DE) .......................... 102017121098.9

(51) Int. Cl.
*G06T 7/246* (2017.01)
*G06V 20/52* (2022.01)
(Continued)

(52) U.S. Cl.
CPC ... *G05B 19/4183* (2013.01); *G05B 19/41865* (2013.01); *G06Q 50/04* (2013.01);
(Continued)

(58) Field of Classification Search
CPC .......... G06T 7/20; G06T 7/246; G06T 7/248; G06T 7/292; G06T 7/97;
(Continued)

(56) References Cited

U.S. PATENT DOCUMENTS

2011/0200245 A1    8/2011    Crothers ....................... 382/141

FOREIGN PATENT DOCUMENTS

DE    19843602 A1    5/1999    ............. G05B 13/00
DE    2380709 A2    10/2011    ................ B25J 9/16
(Continued)

OTHER PUBLICATIONS

Machine translation of DE 10 2014 218 096 A1 (Year: 2016).*
(Continued)

*Primary Examiner* — Andrew W Johns
(74) *Attorney, Agent, or Firm* — Fish & Richardson P.C.

(57) ABSTRACT

A method for manufacturing control of machining of workpieces in a manufacturing hall that includes providing a plurality of image acquisition devices configured to acquire image sequences of allocated observation areas, identifying an object to be tracked in a first image of a first image sequence using at least one object feature, determining positions of the object feature in images of subsequent image sequences, determining a current position of the object by localizing the object feature in a temporally current image of one of the image sequences, and assigning
(Continued)

the position of the object feature in the temporally current image to a current position in the observation area of the image sequence that includes the temporally current image, and integrating the determined current position of the object into the manufacturing control of the hall.

22 Claims, 6 Drawing Sheets

(51) Int. Cl.
  *G05B 19/418* (2006.01)
  *G06Q 50/04* (2012.01)
(52) U.S. Cl.
  CPC .............. *G06T 7/248* (2017.01); *G06V 20/52* (2022.01); *G05B 2219/31304* (2013.01); *G05B 2219/31432* (2013.01); *G05B 2219/32055* (2013.01); *G06T 2207/10016* (2013.01); *G06T 2207/30164* (2013.01); *G06V 2201/06* (2022.01)
(58) Field of Classification Search
  CPC ........................ G06T 2207/30164; G06K 9/00; G06V 20/52; G06V 20/53; G06V 20/54; G06Q 50/04; G05B 19/4183; G05B 19/41865; G05B 2219/31432; G05B 2219/32055
  See application file for complete search history.

(56) References Cited

FOREIGN PATENT DOCUMENTS

| | | | |
|---|---|---|---|
| DE | 102011011930 A1 | 8/2012 | ............ G06M 11/00 |
| DE | 102014218096 A1 | 3/2016 | ................ G07C 3/14 |
| DE | 202016106352 U1 | 12/2016 | ............ G08C 23/00 |
| DE | 102016120131 A1 | 4/2018 | ................ B23Q 7/12 |
| DE | 102016120132 A1 | 4/2018 | ............ B23Q 17/24 |
| DE | 102016220015 A1 | 4/2018 | ............ G06Q 50/04 |
| DE | 102017107357 A1 | 4/2018 | ................ B07C 7/02 |
| DE | 102017120382 B3 | 10/2018 | ............ G06Q 50/04 |
| DE | 102017120358 A1 | 3/2019 | ............... B60Q 1/08 |
| DE | 102017120378 A1 | 3/2019 | ............ G06Q 50/04 |
| DE | 102017120381 A1 | 3/2019 | ............ G06Q 50/04 |
| DE | 102017120383 A1 | 3/2019 | ............ G06Q 50/04 |
| DE | 2996006 B1 | 4/2020 | ............ G05B 23/02 |

OTHER PUBLICATIONS

EP Office Action by European Appln. No. 18752130.7, dated Nov. 23, 2021, 16 pages (with English translation).
DE Office Action in German Appln. No. DE 10 2017 121 098.9, dated Jul. 20, 2018, 15 pages (English Translation).
PCT International Search Report and Written Opinion in International Appln. No. PCT/EP2018/01161, dated Nov. 27, 2018, 27 pages (with English translation).
Wikipedia.com [online], "Optical flow," retrieved on Mar. 18, 2020, retrieved from URL<https://en.wikipedia.org/wiki/Optical_flow>, 7 pages.

* cited by examiner

OBJECT TRACKING-BASED CONTROL OF MANUFACTURING PROCESSES IN THE METALWORKING INDUSTRY

CROSS REFERENCE TO RELATED APPLICATIONS

This application is a continuation of and claims priority under 35 U.S.C. § 120 from PCT Application No. PCT/EP2018/071161, filed on Aug. 3, 2018, which claims priority from German Application No. 10 2017 121 098.9, filed on Sep. 12, 2017. The entire contents of each of these priority applications are incorporated herein by reference.

TECHNICAL FIELD

The present disclosure relates to methods for monitoring and controlling manufacturing processes in the industrial manufacturing of workpieces in metal and/or sheet metal processing. Furthermore, the disclosure relates to systems for workpiece position monitoring in manufacturing halls of the metalworking industry, such as in steel and/or sheet metal processing. Furthermore, the disclosure concerns the assignment of workpieces to process courses within the framework of manufacturing control.

BACKGROUND

In the metal processing industry many parts of different sizes are often fed to various processing steps in industrial steel and/or sheet metal processing. For example, workpieces on machine tools, such as laser cut materials or punched sheet metal parts, are sorted and fed to further processing steps. After processing, cut or punched workpieces are often made available to the respective downstream production step in a group. The various process courses are usually performed manually based on a visual comparison with paper-based documents. However, if many different partial shapes are cut, a wide variety of processing steps are carried out and different areas in a manufacturing hall for metal and/or sheet metal processing are approached, such that monitoring and control processes become complex and error-prone. For example, a high diversity of parts can cause errors in part assignment and subsequent processing steps, e.g., when putting down parts in designated workpiece collection point units in line with a specific order or when transporting parts to the subsequent processing step. If, for example, parts are put down incorrectly, a subsequent processing step can be negatively affected, e.g., incorrectly performed.

For example, a physical material flow is usually manually synchronized with processing steps to be carried out in a discrete manner at booking stations, so that often no detailed or only a delayed evaluation can take place.

For example, German patent applications DE 10 2016 120 132.4 and DE 10 2016 120 131.6 filed on Oct. 21, 2016, describe methods to support the sorting process of workpieces produced with a flatbed machine tool, and generally methods to support the processing of workpieces. Furthermore, a supporting method for the sorting of e.g., cut material of a flatbed machine tool is described in German patent application DE 10 2017 107 357.4 filed on Apr. 5, 2017. The above-mentioned German patent applications are incorporated herein by reference in their entireties.

Furthermore, the German patent applications DE 10 2017 120 358.8, DE 10 2017 120 381.8, DE 10 2017 120 382.6, and DE 10 2017 120 383.4, each with a filing date of Sep. 5, 2017, relate to the use of ultra-wideband technology for localizing mobile units in manufacturing halls. These German patent applications are also incorporated herein by reference in their entireties.

SUMMARY

A first aspect of this disclosure is based on methods and systems that can intelligently support manufacturing processes, especially in the field of metal processing, for example steel and/or sheet metal processing.

In a first aspect, the disclosure features methods for the manufacturing control of process courses in the industrial processing of workpieces according to processing plans, in particular in metal and/or sheet metal processing, in a manufacturing hall for the manufacture of an end product. These methods include the following steps: providing a plurality of image acquisition devices in the manufacturing hall, which are configured to acquire image sequences from allocated observation areas in the manufacturing hall, identifying an object to be tracked in a first image of a first of the image sequences using at least one object feature being present as a pixel structure in the pixels of the first image, determining the processing plan that relates to the object to be tracked, determining the positions of the object feature in images of the first of the image sequences that were acquired temporally after the first image, determining a current position of the object to be tracked by localizing the object feature in a temporally current image of one of the image sequences and assigning the position of the object feature in the temporally current image to a current position in the observation area of the image sequence that includes the temporally current image, and integrating the determined current position of the object to be tracked into the manufacturing control of the industrial manufacturing plant for manufacturing the end product.

In a further aspect, the disclosure provides methods for industrial manufacturing of an end product by using a manufacturing control system that include the following steps: receiving a manufacturing order for manufacturing the end product from a workpiece with a machine control system (MES) of the manufacturing control system, the MES being implemented in a data processing device, selecting individual processing steps with the MES, determining a sequence of processing steps with the MES, wherein the processing steps include individual or several of the following operations: cutting, in particular laser cutting, punching, bending, drilling, threading, grinding, joining, welding, riveting, screwing, pressing, treating the edges and surfaces; data-technically assigning, e.g., by computer automation, the processing steps to a machine or a workstation unit, data-technically assigning the manufacturing order to an object to be tracked in the MES, manufacturing a workpiece for the end product, whereby it is processed, in particular to a part of the end product, after a first of the processing steps on the machine or workstation unit assigned to the processing step, (optional step of spatial assigning a mobile unit assigned to the manufacturing order to the manufactured workpiece), storing a status change of the manufacturing order in the MES, transport of the manufactured workpiece (optionally together with the mobile unit) according to the manufacturing order to the next machine or workstation unit in the predetermined sequence, performing the processing step on this machine or workstation unit, storing a status change of the manufacturing order in the MES, and performing the processing steps of the manufacturing order with the MES, whereby the position of the object to be tracked can be determined by the MES in accordance with the procedure outlined above, and the MES has data on the current status and position of the object to be tracked at any time.

In another aspect, the disclosure features manufacturing control systems for the control of manufacturing processes in a manufacturing hall, in particular in a metal and/or sheet metal processing industrial manufacturing plant. The systems include a plurality of image acquisition devices arranged fixedly in the manufacturing hall, wherein the observation areas of at least two image acquisition devices overlap and/or wherein the observation areas of at least two image acquisition devices are spatially spaced apart, and an analysis unit that is adapted to determine, exchange, and provide data on the position of an object to be tracked in the manufacturing hall and to perform the previously outlined procedures.

The manufacturing control systems can also include a display unit configured to indicate the position of the at least one mobile unit on a site plan of the manufacturing hall. At least one of the image acquisition devices can be installed in a fixed manner and/or can be installed movable, in particular freely movable about a pivot axis and/or along a translation axis, and/or can be installed on a drone.

The manufacturing control systems can also include an indoor location system that includes several transceiver units being installed in the manufacturing hall in a fixed manner, at least one mobile unit, and a (location system) analysis unit. The transceiver units and the mobile unit can be configured to transmit and receive electromagnetic signals. The analysis unit is configured to determine the positions of the mobile unit and thus the position of an object in the manufacturing hall to be tracked, wherein the object is assigned to the mobile unit, from the runtimes of the electromagnetic signals between the transceiver units and the mobile unit.

The following aspects can be implemented in some embodiments. The image acquisition devices can be configured in different ways. For example, the image acquisition devices can be configured as (video) cameras. An image acquisition device can be easily installed on or near the machine tool or a workstation unit and the image information can be evaluated directly. Machine tools or workstation units can also be retrofitted with such an image acquisition device and with such a location system. The image acquisition device can be fixed or movable. It can also be used for other tasks such as when loading and unloading or for security purposes.

Image acquisition devices can work in the light range visible to humans. However, they can also work alternatively or additionally in the non-visible range, e.g., IR or UV range. They can also be equipped with their own light sources for additional illumination. Furthermore, existing cameras, generally existing image acquisition devices, which are e.g., already provided on, inside, and/or outside of machines within the manufacturing plant for other purposes, can be included in the described system of image-based tracking. However, the image acquisition devices can also be configured as an ultrasonic sensor, especially with an additional sound source.

The image sequences of the image acquisition devices can have a unique time reference to the position determination and with respect to each other.

In some embodiments, the object to be tracked can be tracked within the images provided solely on the basis of typical pixel changes assigned to an object feature. The identifying of the object to be tracked can be done in the first image with a software system that provides information about the position of the object in the first image, especially by an object information area superimposed on the observation area. Localizing the object feature can involve determining an object feature vector describing the movement of the object feature between images of the first of the image sequences and projecting the object feature vector into an image of a second of the image sequences. An object feature can be a specific geometric shape, a color, a light signal, e.g., from an LED, or an extension of an area in the image. An object feature vector can be a direction vector or a velocity vector of an object feature.

In some embodiments, when the object feature leaves an observation area within the manufacturing hall that is allocated to the image sequence, it is possible to check whether an object feature corresponding to the object feature and/or object feature vector can be identified in a suitable location/time window of a further image sequence—in particular with sufficiently high probability. This can be done with the help of suitable image evaluation means and image evaluation procedures/programs.

In general, the object to be tracked can be a workpiece, a transport device, a tool, a mobile unit, or a person.

In some embodiments, the observation areas of the first image sequence and a second image sequence can have an overlap area and a transfer of the object features from the first image sequence to the second image sequence can be performed using pixel values in the overlap area of images taken at essentially the same time.

In some embodiments, assigning the position of the object feature in the current image to a current position in the observation area of the image sequence can include providing reference points in the observation areas, and calculating an exact location/space point in time of the object to be tracked using at least one reference point.

In some embodiments, the method can also include recording and/or providing the specified position via a suitable interface and/or integrating the determined position into a motion analysis of the object to be tracked.

In some embodiments, the method can also include defining zones and/or spatial gates in the manufacturing hall, in particular in a site plan of the manufacturing hall, and comparing the determined position of the object to be tracked with respect to the zones and/or spatial gates and controlling the production based on the comparison. The comparison of the determined position can show, for example, that the object to be tracked is in or has left a zone or that the object to be tracked has passed a spatial gate. The zones and/or the spatial gates can be defined in two or three dimensions.

In some embodiments, including the specific position of the object to be tracked can involve one or more of the following steps: outputting signals for the support of localizing the object to be tracked; displaying information on the position and/or the manufacturing status of the object to be tracked, in particular on a mobile output device such as a tablet, smartphone, or a surveillance monitor; setting operating parameters of a machine tool; updating a log which logs the manufacturing, in particular processing steps; assigning the object to be tracked to an order for manufacturing one or more end products in several different processing steps.

If the object to be tracked is a workpiece, including the determined position of the object to be tracked can include: controlling and/or monitoring a processing of the workpiece in several different processing steps, which are carried out at different locations, but in particular within the manufacturing hall; controlling and/or monitoring a transport of the workpiece between different processing steps, which are carried out at different locations, but in particular within the manufacturing hall; controlling and/or monitoring a processing of the workpiece at workstations, which form a network with the manufacturing control or are integrated into the manufacturing control; and/or controlling and/or monitoring a processing of the workpiece at workstations which do not form a network with the manufacturing control or are not integrated into the manufacturing control.

In the case of a manufacturing control supported by an indoor location, the method can include the following steps: providing an indoor location system with a plurality of transceiver units fixedly installed in the manufacturing hall, at least one mobile unit, and a localization analysis unit, wherein the transceiver units and the mobile unit are configured for transmitting and receiving electromagnetic signals and the localization analysis unit is configured to determine the positions of the mobile unit in the manufacturing hall from runtimes of the electromagnetic signals between the transceiver units and the mobile unit; assigning the mobile unit to at least one object, in particular an object to be tracked; determining the position of the at least one assigned object by localizing the assigned mobile unit with the indoor location system; integrating the determined position into the assignment process, in which a pixel structure is determined in the image for an object to be tracked, and/or into the manufacturing control of the industrial manufacturing plant for the manufacture of the end product, in particular into the image acquisition device-based tracking (hereinafter also referred to as image-based tracking).

Integrating the image acquisition device-based tracking into a manufacturing system can be done with the following units: an image acquisition device unit, which provides image sequences (video streams) with a temporally sufficient image repetition frequency and pixel resolution, a position recognition system with an object recognition unit, which, with the help of suitable object recognition methods, localizes the object to be tracked at a specific time and location in a (first) image sequence (video stream) of one of the image acquisition devices, an image sequence analysis unit, which, with the help of image sequence analysis software, tracks the object within the provided image sequences solely on the basis of the typical pixel changes (movement), without uniquely identifying the object to be tracked as such, an image sequence change unit, which assigns the object to be tracked to an area in an image sequence of a second image acquisition device. The image sequence change unit can further be configured to derive at least one object feature vector from a first image sequence and, based on the object feature vector, to assign the object to be tracked to a pixel area in an image of a (second) image sequence.

Several workpieces, such as those that have the same shape in the end state and have passed through the same processing steps, and those that also belong to a common order, are called workpiece collection units or a workpiece group. These are usually put down at a workpiece collection point unit. It is advantageous to assign a workpiece collection point unit and possibly a mobile unit to each workpiece collection unit. A list of all orders (including processing plans) can be stored in the manufacturing control system. Each of the orders can be assigned to a workpiece collection unit. When the image acquisition device-based tracking of objects is implemented, each order with the workpieces, workpiece collection point units, or mobile units belonging to the order can be localized within the manufacturing hall at any time. Within the manufacturing control system, this can further be combined with reported information of work places and/or machines.

The image acquisition device-based tracking of objects is featured by the fact that the determination of the position of the objects can be done solely by observation with the various image acquisition devices provided in the manufacturing hall, e.g., without manual interaction. Previous systems for localizing workpieces or orders in manufacturing plants have the disadvantage that lost workpieces or orders must be searched for manually. It has been recognized that these manual searches, especially in manufacturing plants with a high number of small and constantly changing orders, e.g., in contract manufacturing plants, account for an enormously high proportion of non-productive time. With the tracking in line with the disclosure and the system described, the positions of the workpieces and thus of the orders can be called up on a screen, filtered, or specifically located, for example. The need for time-consuming manual searches of workpieces, but also of tools or persons, can thus be drastically reduced, especially in (metal and/or sheet metal processing) industrial manufacturing.

In some embodiments, the processing of the workpiece or workpieces is controlled or monitored at workstations that are part of a network with or are integrated into the manufacturing control. Such machine workstations include machines that receive manufacturing instructions, in particular in a digital manner, via a data link and execute the manufacturing instructions. No or only minimal intervention by the operator is possible. Such machines are usually referred to as automated or fully automated machines. Such machines can also report the status of the manufacturing to a manufacturing control system.

In some embodiments, the machining of the workpiece or workpieces is controlled and/or monitored at workstations that form a network with the manufacturing control system only to a very small degree or not at all or are not integrated into the manufacturing control. These can be workstations where the processing steps are carried out manually by human hand or workplaces, which can have machines but which are networked only to a very small degree or not at all or which can be networked only in a complicated manner, e.g., so-called "manual workstations" as described in DE 10 2016 220 015.1, filed on Oct. 13, 2016. This German patent application is also incorporated herein by reference in its entirety.

Workstations that are only networked to a very small degree can be manual workstations with simple machines, such as workstations for drilling, sawing, milling, and bending. Their only network connection can be a monitoring system. e.g., as described in DE 10 2016 220 015.1. Another possibility to connect to a network is the monitoring of the power consumption of such machines and the networking of the information from the power consumption. For example, if a machine has not consumed any power at all, it can be concluded that the machine cannot have processed the order yet.

The combination of manufacturing processes with workstations, which are networked with or integrated into the manufacturing control system, and those workstations which are not, or only to a very limited extent, represent an important obstacle to effective and efficient manufacturing control, because orders are still printed on paper when they are transferred from an automated workstation to a non-automated workstation. This slows down manufacturing. This also makes flexibility more difficult if, for example, an order that is to be processed particularly quickly with several processing steps is to be processed at several workstations within a short time. A manufacturing company that can ensure this smoothly has advantages over its competitors who cannot. With the image acquisition device-based tracking of workpieces and the linking of the position information obtained with the tracking with the manufacturing control system, the concepts disclosed herein can enable a flexible and fast manufacturing of end products.

Based on the concepts disclosed herein, intelligent assistance systems in manufacturing halls can use 2-D or 3-D position determination of workpieces (generally material) and optionally persons (e.g., operators), transport media, machines, tools, and much more to support manufacturing processes. This makes it possible to use 2D or 3D positions as information in the context of a holistic manufacturing control and digitization of factories, where the information can be available in addition to further sensor information and was determined according to the concepts disclosed herein.

It was recognized that the use of such image acquisition device-based tracking systems is possible especially when considering the expected processes in a manufacturing hall in the special environment of a metal and/or sheet metal processing industrial manufacturing. Accordingly, such image acquisition device-based tracking systems can be integrated into a manufacturing execution system (also referred to herein as an MES or machine control system).

With reference to the above-mentioned registering of physical material flow and processing steps, when using the image acquisition device-based tracking system a complexity can be generated in the low-expenditure, dynamic assignment of acquired location information to physical components. The concepts disclosed herein address this complexity and allow, for example, to assign a position information to manufacturing orders with assigned identifiers without time-consuming interaction.

Image acquisition device-based tracking systems can allow the detailed mapping of material flows in manufacturing within a manufacturing hall into digital processing of process. Tracking systems can simplify the localization of objects/persons, which participate at the manufacturing, in the manufacturing environment. If tools, operating resources, or load carriers are initially once included in the image acquisition device-based tracking system, they can be integrated into the digital control system. This also applies to objects that are temporarily involved in the manufacturing, such as production orders or service personnel. Temporarily required dynamic tracking can occur again and again and are only needed for a few hours, days, or weeks in the manufacturing hall.

The embodiments disclosed herein for the integration of such a tracking into the processes of metal processing can include, inter alia, the following method steps, uses, and advantages: mapping of the changing association of orders, mapping of an assistance for a person, e.g., an operator, with the help of the tracking system and other sensor technology, especially for the localization of workpieces and tools, ensuring a process-safe and low-cost manufacturing through automated procedures with low degrees of freedom for the operator, and intuitive course of manufacturing without time-consuming information collection for the operator.

When tracking workpieces, orders, persons (e.g., operators), and/or tools, many requirements must be taken into account. It was recognized that the industrial manufacturing is increasingly directed towards the manufacturing of small series with many separate processing steps (manufacturing processes such as cutting, bending, grinding, and/or surface treatment) at different workstations such as machine workstations and manual workstations. Often several hundred different orders have to be completed in one day, all of which require different processing steps.

As soon as only one malfunction occurs, the manufacturing control can quickly become very confusing. Spending a lot of time, half or not yet processed orders are searched for in the manufacturing hall by individual persons and their status is determined. This is then transmitted to the manufacturing control. This can lead to a considerable loss of time during the actual manufacturing.

Due to the ever-faster processing steps in productive processing and with the increase in the number of different orders with ever smaller numbers of identical parts, such failures can occur more and more frequently. The resulting time losses reduce productive time. If orders, workpieces, persons, e.g., operators, and tools are to be found quickly, the localization of at least some of these units, as disclosed herein, is helpful in reducing missing time. In particular, it meets the very high requirements for industrial manufacturing.

In industrial manufacturing, the aim is to be able to query positions in real time. Such an enquiry should be precise enough in terms of location so that workpieces can be reliably located and/or assigned to the processing steps. The tracking should also be flexible, it should be possible to combine several orders into one order, an order should be dividable into several orders, etc. The tracking should be easy to use and should be fail proof.

In general, the concepts disclosed herein can enable an increase in process reliability, an optimization of throughput times and correspondingly a cost optimization of production. In particular, the concepts disclosed herein can result in sometimes considerable time savings in the manufacturing process, whereby the manufacturing process extends, for example, from the creation of a required number of parts to the correct transfer to a subsequent process (e.g., a subsequent metal processing step). Furthermore, several orders can be worked on simultaneously and with process reliability. The concepts disclosed herein also allow for easy assignment of workpieces within the image acquisition device-based tracking system. In this way, open orders can be optimized despite the complexity of several orders to be processed simultaneously.

Furthermore, flexible processing of different process courses with the accompanying time savings can be achieved if machines such as laser cutting machines and/or punching machines are integrated into the semi-automated manufacturing process. In addition, error prevention and the automatic, correct recording of workpieces, processing steps, etc., can provide the basis for data-based real-time control of metal processing (e.g., steel and sheet metal manufacturing). Accordingly, machine tools used for the creation of small batches of workpieces can also be integrated into a manufacturing process controlled by an MES within the framework of Industry 4.0.

In comparison to object identification and localization via radio technologies (e.g., Bluetooth LE) or optical methods (bar codes, dot matrix codes) at defined points such as points to be passed ("gates") in the manufacturing hall, the concept of tracking proposed herein can have many advantages, including objects to be tracked do not need to be modified (no labelling or attachment of electronics necessary); if an object is not modified, it is not necessary to rely on its identification via a load carrier (carriage, pallet, etc.) on which the object is placed; the available position information is not only available at specific times and defined locations; and there is no need for a power supply as with active and mobile radio technologies.

An indoor location-based control system as disclosed, for example, in DE 10 2017 120 358.8, can be combined with the tracking system based on the image acquisition device. The combinability includes the integration of the indoor location into the identification of an object within an image (determination of a pixel structure) as well as the common use for a comprehensive and complementary provision of position information of objects and persons involved in the manufacturing. A mobile unit of an indoor location system can itself be an object to be tracked by the image sequences. Furthermore, two methods/systems for localization can be used, which can be compared and learn from each other.

The concept of image-based tracking disclosed herein allows continuous object tracking during a multi-stage manufacturing process within a manufacturing hall and can thus be easily used in intralogistics applications. Described is image sequence-based object tracking, which enables object tracking without optical geometry recognition by smart data applications (machine learning, artificial intelligence, etc.).

An example of an implementation of the concept for object tracking includes the following steps, for example:

the manufacturing hall, at least the area relevant for object tracking, is monitored in an overlapping manner with several image acquisition devices. The image acquisition devices provide the manufacturing control system with video streams (image sequences) with a sufficiently high image repetition frequency and pixel resolution.

an object is selected within the framework of the manufacturing control. The position of the selected object is determined in the manufacturing hall and subsequently remains available in the manufacturing control system despite position changes in the manufacturing hall resulting from the manufacturing process.

with the help of a suitable object recognition procedure, the object to be tracked is localized at a position for a certain point in time. This is for example an unloading station of a machine tool, like a sorting table. The localization is uniquely carried out via a software (SW) system provided by superordinate systems.

an image sequence analysis SW tracks the object within the provided image sequence exclusively on the basis of typical pixel changes (movement), without uniquely identifying the actual object as such. This means that no object detection is necessary, which runs over the image sequences. In the area of image analysis SW and image sequence analysis SW, reference is made to known procedures for real-time image analysis.

Some implementations can also include the aspect of tracking with several image acquisition devices, e.g., if the object to be tracked leaves the observation area of a first image acquisition device, the tracking is transferred to a second image acquisition device.

If the images of the first image acquisition device and the second image acquisition device (slightly) overlap, the object to be tracked can be uniquely identified when moving into the detected area of the second image acquisition device and it can be subsequently tracked in the image sequence of the second image acquisition device.

If there is no spatial overlap of the observation areas of the first image acquisition device and the second image acquisition device (non-overlapping image sequences), velocity and/or direction vectors of the object to be tracked can be determined based on the first image sequence using analytical methods of the positions known in the first image sequence. These allow the object to be tracked to be assigned to an object appearing in the second image sequence. The identification can usually be carried out with a sufficiently high probability, because the suitable image sequence features (object feature vectors such as direction and/or speed vectors, object features such as colors, object sizes, etc.) allow a suitable allocation.

Some implementations can also include the aspect that by the use of machine learning algorithms the probability of assigning objects to a subsequent image sequence is further improved.

Fully or partially automated assignment of a processing plan connect, for example, a production order with a specific mobile unit of, for example, an ultra-wideband (UWB) location system. They can be carried out, for example, by a combined use of an assistance system in the operator's environment, the image acquisition device-based tracking system and an e.g., UWB location system.

In addition to the assignment to be made, e.g., of a workpiece to an initial image sequence, the object (e.g., the assigned workpiece) can also be assigned to an associated production order (e.g., the production order of the workpiece). Such fully or partially automated assignment of a processing plan link, for example, a production order with a specific object being tracked.

A system that allows the above exemplary implementation of the concept includes, for example:

a monitoring of the manufacturing hall with several image acquisition devices.

the provision of image sequences with a clear time reference within an analysis environment in real time.

an initial recognition (image sequence-frame-object assignment) of an object to be tracked using suitable image recognition in a frame of an image sequence to provide object position, object identity, at least one object feature to which an object-feature vector can be assigned in an image sequence (object-feature vector assignment).

object tracking with suitable streaming tools and algorithms within an image sequence.

when the object leaves an area in the manufacturing hall assigned to the image sequence, check (with the aid of suitable image evaluation means and image evaluation methods/programs, also known as analytics tools and routines) whether an object corresponding to the object feature vector can be identified with sufficiently high probability in a fitting location/time window of another image sequence.

improvement of the object recognition with the help of machine learning methods, so that the object geometry no longer has to be recognized by optical methods.

calculation of an exact location/space point in time of the object based on reference points as well as recording and/or providing the same via a suitable interface.

An example of an assistance system for the initial recognition is, for example, an optical assistance system in which optical sensors are used to recognize workpieces or tools grasped by the operator and, in the context of the available production data from the production orders, to (preferably) unambiguously identify them for the processing plan assignment. An exemplary assistance system is disclosed in the above-mentioned DE 10 2016 120 131.6. Such assistance systems can also be used for processing plan assignment, for example, when image data relates to the workpiece and the processing plan.

The processing plan assignment can then support further tracking of the object during the subsequent manufacturing process. The close interlocking of the process flow ensures process reliability in the manual environment.

For the digital processing plan assignment, the objects can be linked to production orders. The production orders concern processing processes at various manufacturing stations, for example at a laser cutting machine or a punching machine as well as, for example, at a picking station. The digital assignment can be done, for example, by placing an object in a geometrically defined zone. Thereby, information on this order can be loaded for the tracking or, if required, it can be newly loaded.

The digitally assigned objects can, for example, be workpiece collection points such as carriages or pallets, generally load carriers, on which the workpieces can be put during production, possibly with an image acquisition device on a chassis. Tools can also be digitally assigned as objects.

As an alternative or in addition to the image acquisition device-based assistance system, dynamic processing plan assignment can be carried out by, for example, scanning order papers and/or a code (e.g., barcode, QR code, etc.). As an alternative or in addition to processing the information on order papers, the nominal geometry of the workpiece can be used. After a comparison of the geometry of the workpiece, for example, recorded with the assistance system based on the image acquisition device, with the target geometry, information can be reloaded from the central production data system and used for the tracking.

If the image processing of the initial allocation does not allow a unique identification, the operator can be given a list of the active production orders that are suitable for the geometry being acquired. The operator then makes the final selection and establishes the digital assignment. In this way, process reliability can be improved. Workpieces/tools that appear similar can be tracked as objects without being confused, incorrectly assigned and erroneously processed by the user.

DETAILED DESCRIPTION

Aspects described herein are partly based on the realization that with the accuracy and reliability of image acquisition device-based tracking systems, for example with an accuracy in position determination of less than 30 cm, e.g., less than 20 or 10 cm, the use of image acquisition device-based tracking systems in industrial manufacturing becomes feasible.

Figure 1:
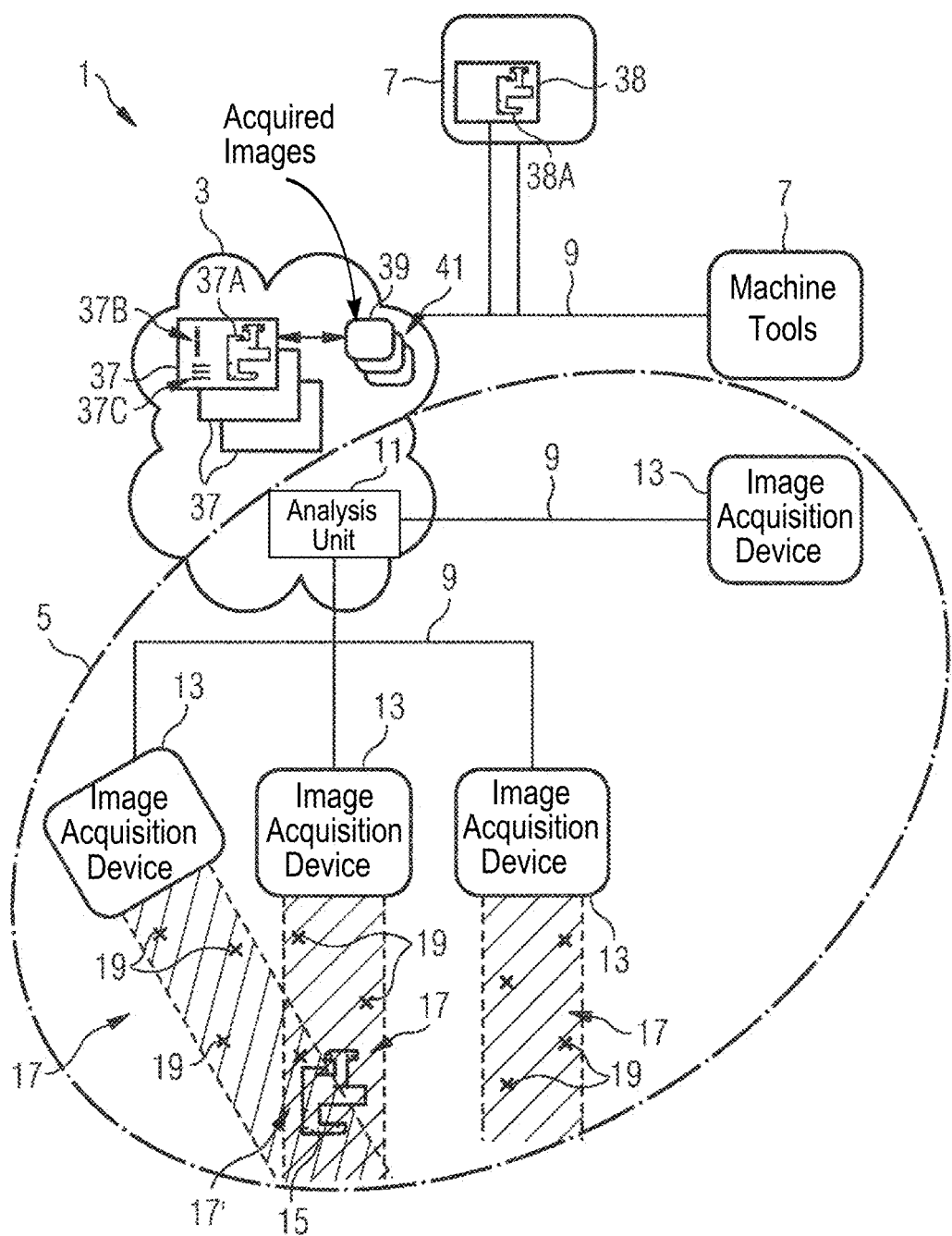
FIG. 1 shows an exemplary schematic representation of a manufacturing control system with an image acquisition device-based tracking system.

FIG. 1 schematically shows a manufacturing control system 1 that includes an MES (Manufacturing Execution System) 3 and an image acquisition device-based tracking system 5 (herein also referred to as a tracking system).

The MES 3 is connected to one or more machine tools 7 positioned in a manufacturing hall via wireless or wired communication links 9. In general, the MES 3 is used to control process courses/manufacturing steps in the industrial manufacturing of workpieces with the machine tools 7, and controls the machine tools 7. The MES 3 receives information about the process courses/manufacturing steps as well as status information of the machine tools 7. The MES 3 represents a data processing system or, in general, a data processing method that can be implemented in a data processing device. This can be a single electronic data processing device (server) or a group of several data processing devices (server group/cloud). The data processing device or the group can be provided locally in the manufacturing plant or it can be set up external in a decentralized manner.

A platform on which the data processing devices can be made available—e.g., on which the MES 3 can be implemented—can be a so-called cloud. The cloud includes, for example, an external server with computing and storage capacity that can be used simultaneously by several product manufacturers. Access authentication, passwords, etc., can be used to ensure that no manufacturer can access the data of another manufacturer or the operator of the manufacturing plant. It can be ensured that no external third party can access the stored data. The protection against unwanted access can be assured by the data stored in the cloud being also processed there and the manufacturer or operator of the manufacturing plant who wants to use the data in turn processes the data only in the cloud. Such cloud usage can lead to a significant simplification of system configurations and an associated cost saving.

The data processing device can have a graphical user interface (GUI) with various application programs (APPs). By providing different APPs that can run a specific application program, the manufacturing software that a company needs can be set up in segments so that—depending on need—it only has to be accessed when it should be used, such as when using a specific APP. This allows the provider who provides the manufacturing software to be remunerated depending on the respective need.

The tracking system 5 can include an analysis unit 11 and several image acquisition devices 13 intended for the observation of objects 15. The image acquisition devices 13 can be cameras. The tracking system 5 can also interact with the MES 3. For example, the tracking system 5 can be configured as a part of the MES 3.

The object 15 can be a workpiece, a device of transport for workpieces, a tool, or a person. The object 15 can be present in one or more observation areas 17 of the image acquisition devices 13 during the manufacturing and is thus imaged in acquired images 39 of the image acquisition devices 13, stored in the MES 3 (or the analysis unit 11). The images 39 (also referred to as frames) of an image acquisition device 13 form an image sequence 41 (also referred to as video stream).

The position of the object 15 can be determined in the observation area 17 of an image acquisition device 13, for example, via reference points 19, which are also imaged and indicated schematically in FIG. 1.

In general, the data communication of an image acquisition device 13 with the manufacturing control system 1, especially with the MES 3, can be bidirectional. For example, an image acquisition device 13 can be oriented accordingly by the MES 3 or it can be set in its operating parameters such as frame rate, exposure, etc.

In some embodiments, WLAN transmission stations can be integrated into an image acquisition device 13 for data access into the manufacturing control system 1, so that digital data can be accessed via this image acquisition device 13 within the manufacturing hall by mobile devices, e.g., via smartphones or tablets. The integration of the WLAN transmitting stations into the image acquisition device 13 can simplify the installation and operation of a data communication system in the manufacturing hall.

The analysis unit 11 can serve as a central master position determination unit (also referred to herein as "Server"). It defines the tracking process and the data exchange with the MES 3.

A group of image acquisition devices 13 can be assigned to a master position determination unit and the image sequences can be transmitted to the same. For the acquisition of positions in large manufacturing halls or across several buildings or rooms, several groups of image acquisition devices 13 can be provided, each assigned to its own master position determination unit. These master position determination units can in turn communicate with each other. Depending on the position of the object 15 to be tracked, different master position determination units (servers) can be used for tracking.

FIG. 1 also shows an example of processing plan 37. A processing plan 37 can include a geometry data set 37A and/or a coding data set 37B identifying the workpiece. The processing plan 37 can include one or more processing and workpiece parameters 37C of the corresponding workpiece 23.

Figure 2:
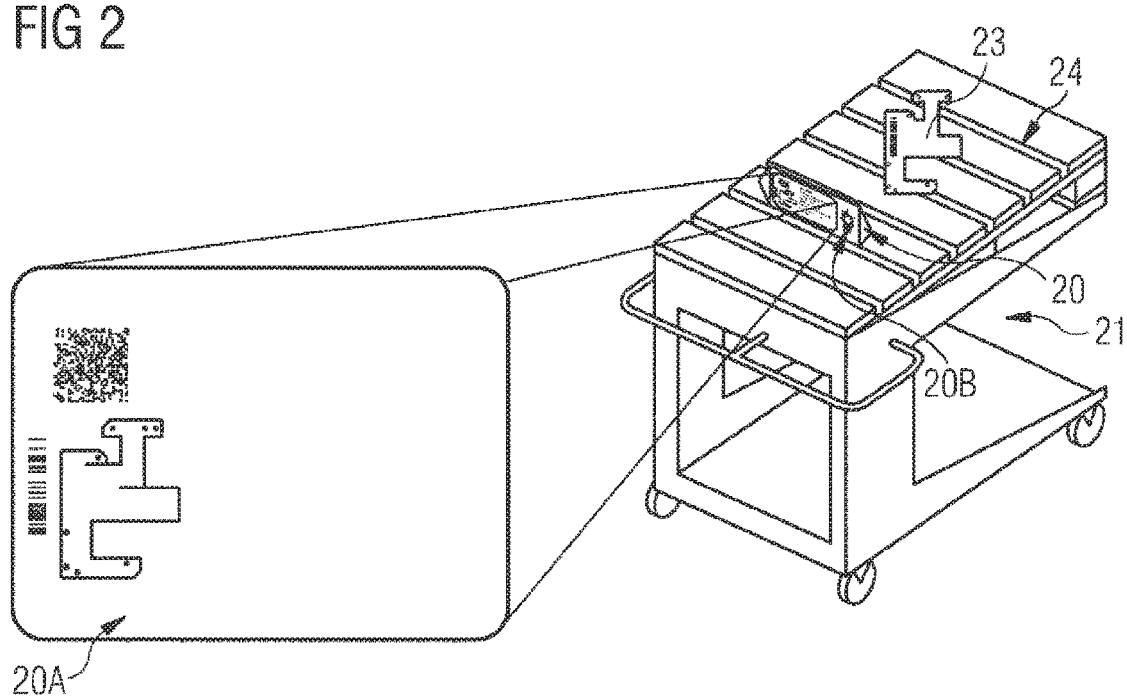
FIG. 2 shows a representation of an exemplary transport carriage for workpieces.

FIG. 2 shows a transport carriage 21 with a workpiece 23 and a mobile unit 20. The transport carriage 21 includes a storage area 24 for one or several workpieces 23, which were generated by a machine tool 7 (shown in FIG. 1) within the scope of a processing plan 37.

The mobile unit 20 is exemplarily placed on the transport carriage 21, but can also be structurally integrated into it. For operator interaction with the mobile unit 20, it can include an electronically controllable display 20A, such as an E-Ink display (also referred to as electronic paper display), and/or one or more signal emitting devices 20B (LEDs) for outputting information. For example, the display 20A shows information specific to these workpieces 23. This can be, for example: type of the current and the next processing step; date, e.g., the date of the completion or the beginning of the order; number of parts to be manufactured; name or identification of the customer or contractor.

On the display 20A, for example, information on the order, readable for man and/or machine, can be displayed coded and/or in written form and/or as a figure. The display 20A can also be used as a signal emitting device for feedback to the user. Further examples of a signal emitting device are a device for emitting sound, especially in the audible range for emitting speech information, and a light such as an LED, which can be recorded as significant object features in the images (39) of an image acquisition device 13. The LED can visually communicate coded information to the MES 3 via the image acquisition device 13 by different colors, flashing frequencies, and/or flashing patterns.

A flashing LED can also be used for position identification, as it is easier to recognize even at large distances than, for example, a specific text on the display 20A. Therefore, a signaling device such as an LED has particular advantages, for example, when a mobile unit 20 is to be tracked in an image sequence or the mobile unit 20 is being searched for during the manufacturing process. The LED can be addressed remotely by an operator and then it can make itself noticeable by a signal. Such a remote-controlled addressing can, for example, be carried out by another mobile unit or by another device, that can be portable (e.g., a smartphone, tablet), or by the analysis unit 11. However, the addressing can also be initiated directly, e.g., via near-field transmitters (e.g., Bluetooth, NFC, IR).

In general, the mobile unit 20 can have as a signal output device a modulatable signal source for generating modulated light, sound, or vibration signals. It can then be used as a data sending communication device for wireless data transmission. Thereby, the communication device can have at least one sensor for receiving light, sound, or vibration signals and the signal processing unit can be programmed to recover from received modulated signals the data contained therein.

At least one signal input device (e.g., a key) for entering parameters can be integrated into the mobile unit 20. The mobile unit 20 can also have a simple sensor as signal input device for receiving light, sound, or vibration signals, such as a brightness sensor. It can then be used as a data receiving communication device for wireless transmission of data, such as access data, from a machine tool.

The mobile unit 20 can also have its own image acquisition device configured to acquire/scan images of workpieces and/or codes (e.g., barcodes or QR codes) on the workpieces or on other documents, tools, or products. In this way, objects (e.g., picked up workpieces) can be assigned to orders. In addition, the mobile unit can have functionality for determining, processing, and transmitting the image acquisition device data.

In the context of an industrial manufacturing of workpieces in metal and/or sheet metal processing, the mobile units 20 are usually assigned to workpieces. Optionally, the mobile unit 20 can be carried by persons in the manufacturing or they can be attached to auxiliary equipment such as transport carriages, machines, and tools. This allows the mobile unit 20 to be assigned to a person, e.g., a worker, or to an auxiliary equipment to support tracking.

Figure 3:
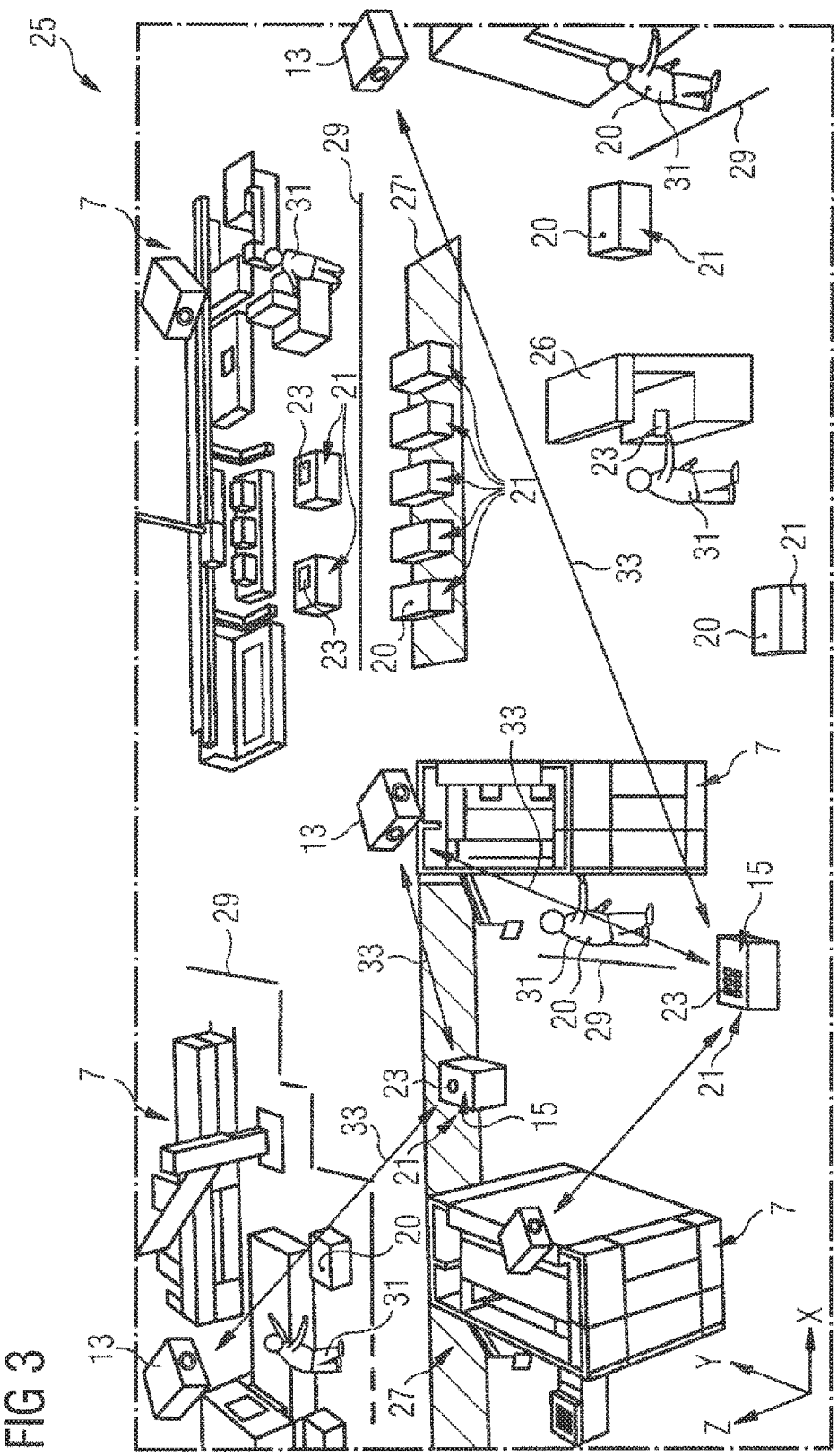
FIG. 3 shows an exemplary digital site plan of a manufacturing hall.

FIG. 3 shows a schematic digital site plan 25 of an exemplary manufacturing hall equipped with several machine tools 7 of different types. Examples of machine tools 7 in steel, aluminum, copper processing, and generally in metal processing, are cutting machines, especially laser cutting machines, punching machines, grinding machines, bending machines, etc. The site plan 25 also shows a workstation 26 which is networked to a very low degree, such as a manual workstation with simple machines, e.g., for drilling, sawing, milling, bending, which are not part of a network or only part of the network via a monitoring system. The map also shows zones 27, 27' and gates 29. The zones 27, 27' and the gates 29 have been defined by an operator with regard to the use of machine tools 7 and associated work processes. The gates 29 extend spatially (e.g., linearly) in the manufacturing hall and define limits, the crossing of which by a mobile unit can trigger specific actions. The zones 27, 27' and the gates 29 can generally be assigned workpiece-specific or object/operator-specific properties.

A view as illustrated in FIG. 3 can be shown schematically on a screen (monitor) of a data processing device (e.g., a PC). Status information can be displayed when individual zones, gates or tracked objects are activated on the monitor (e.g., using a cursor or, in the case of touch pads, a touch).

One can filter for specific objects, e.g., all mobile units/workpieces with assignment to orders of a specific customer.

For example, actions can be triggered by using spatial position determination in the manufacturing control system if an object to be tracked is located within a specific zone or crosses a specific gate, whereby these actions can vary depending on the respective object, e.g., workpiece, and its manufacturing relevance, processing/processing status. The zones 27, 27' and the gates 29 can also be marked in color in the manufacturing hall for better identification in the image sequences.

The site plan 25 schematically also shows workpiece collection points, for example transport carriages 21 or partial areas of the same, which are located near a machine tool 7 or in one of the zones 27, for example. One can recognize schematically operators 31, who operate the machine tools 7.

In the digital site plan 25, therefore, not only stationary elements (machine tools) but also moving elements (workpieces, transport carriages, operators) are displayed. The integration of moving elements into the site plan is made possible by the image acquisition device-based position determination, for example by recording the movement of the transport carriages 21, workpieces 23, and operators 31 as objects to be tracked with the tracking system.

The digital site plan 25 shows exemplary positions of several image acquisition devices 13. The image acquisition devices 13 provide machine-readable image information.

The positions of the image acquisition devices 13 are selected so that a 2D position determination or a 3D position determination can be carried out in the allocated observation areas 17 in the manufacturing hall. As an example, image sequence acquisitions for two movable objects 15 (exemplary transport carriages 21) are illustrated by double arrows 33 in FIG. 3.

The primary application of the image acquisition device-based tracking system 5 is the localization of workpieces 23 as well as mobile units used in manufacturing such as transport carriages 21, forklifts, tools, and other mobile devices, and people. The fact that these objects can be more easily localized during manufacturing using the position information obtained reduces or avoids search times. The obtained spatial information about the objects additionally allows an analysis of process courses and of the utilization of e.g., tools.

Figure 4:
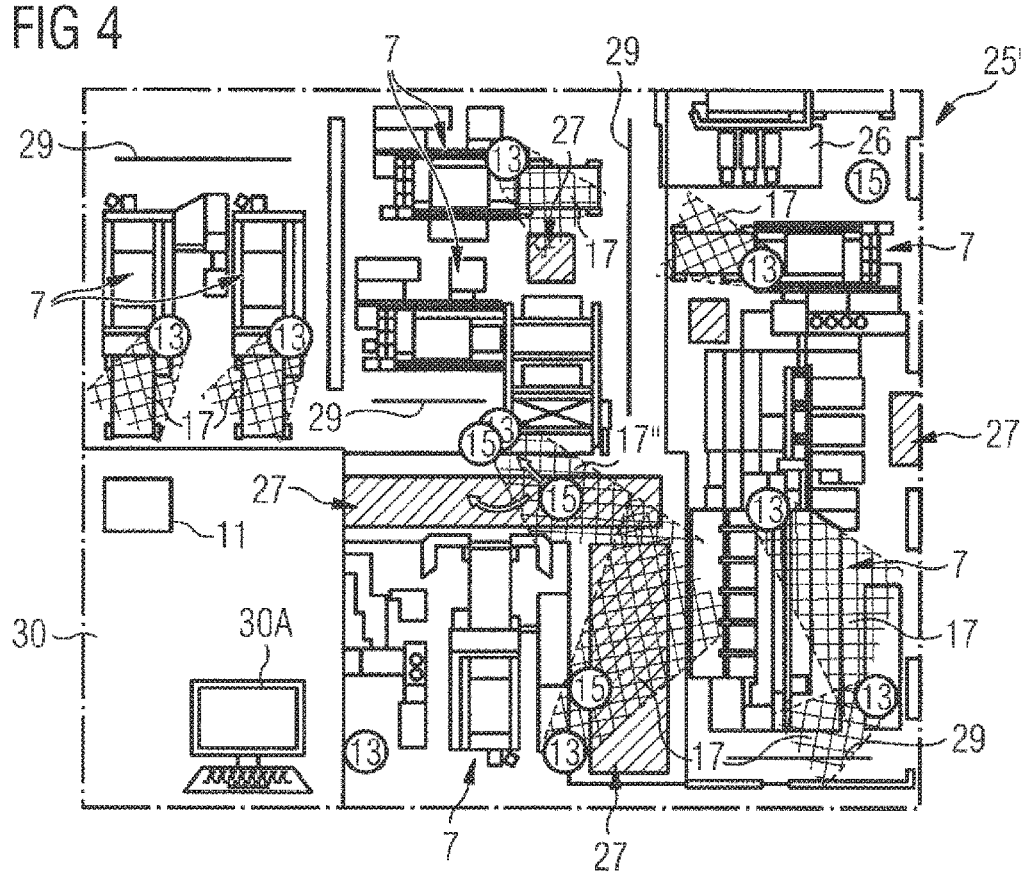
FIG. 4 shows another exemplary digital site plan.

FIG. 4 shows a view of another digital site plan 25' of another exemplary manufacturing hall. Several positions of image acquisition devices 13 with schematically indicated observation areas 17 can be seen. Further, one can see several zones 27 and gates 29.

Using the tracking system, the positions of objects 15 in the site plan 25' and their position in relation to zones 27 and gates 29 can be displayed for control purposes in manufacturing control, especially when processing workpieces. This in turn requires that an object 15, e.g., a workpiece (or a group of workpieces), an operator, a means of transport, a tool, etc., in the observation areas is determined in its position and its change of position.

Image acquisition devices 13 are, for example, installed in a fixed position in the manufacturing hall or they can move along movement trajectories, e.g., to record a zone with a swivel movement (see observation area 17") or to perform a displacement movement along a zone. Image acquisition devices can be provided on drones for flexible use in the manufacturing hall.

The position of a manufacturing control device of manufacturing control system 1 is indicated in a control area 30.

The analysis unit 11 can be positioned here. There can also be a data processing device 30A (e.g., a PC) with a screen (monitor) on which, for example, the digital site plan 25 or 25' illustrated in FIG. 3 or FIG. 4 is displayed.

The assignment of an object to a pixel area in an image of a recorded image sequence can be done by various interactions with the manufacturing control system 1 (hereinafter also referred to as manufacturing control). For example, in a user interface of the manufacturing control system, which is provided on a smartphone or tablet, the respective workpiece/respective object can be selected and assigned to a pixel (pixel area) of a displayed image of an image acquisition device by entering, for example, a respective reference number.

Instead of a manual input, for example, an activation of the display 20A or LED 20B of the mobile unit 20 can support the assignment, either automatically or semi-automatically.

In addition, the assignment can be done by image processing of an image of the object, for example with a marking such as a barcode (see display 20A in FIG. 2). A graphical assignment can be made via a dialog displayed on the user interface. The assignment can be done by including location information from a UWB location system.

In a usage scenario, a person, for example an operator, should bend work pieces 23 according to an order. To do this, the operator accesses data from the manufacturing control system and opens, for example, the digital site plan 25, 25' of the manufacturing hall. If the workpieces are subject to tracking, the operator sees the location of the workpieces 23 to be bent in the site plan 25, 25'. For example, a mobile unit 20 and workpieces 23 were placed on a transport carriage 21 as shown in FIG. 2 and tracked in the various image sequences via the image acquisition devices 15 according to the procedure described above. Accordingly, the symbol transport carriage can be displayed in the site plan, e.g., together with a schematic shape of the workpiece.

Figure 5:
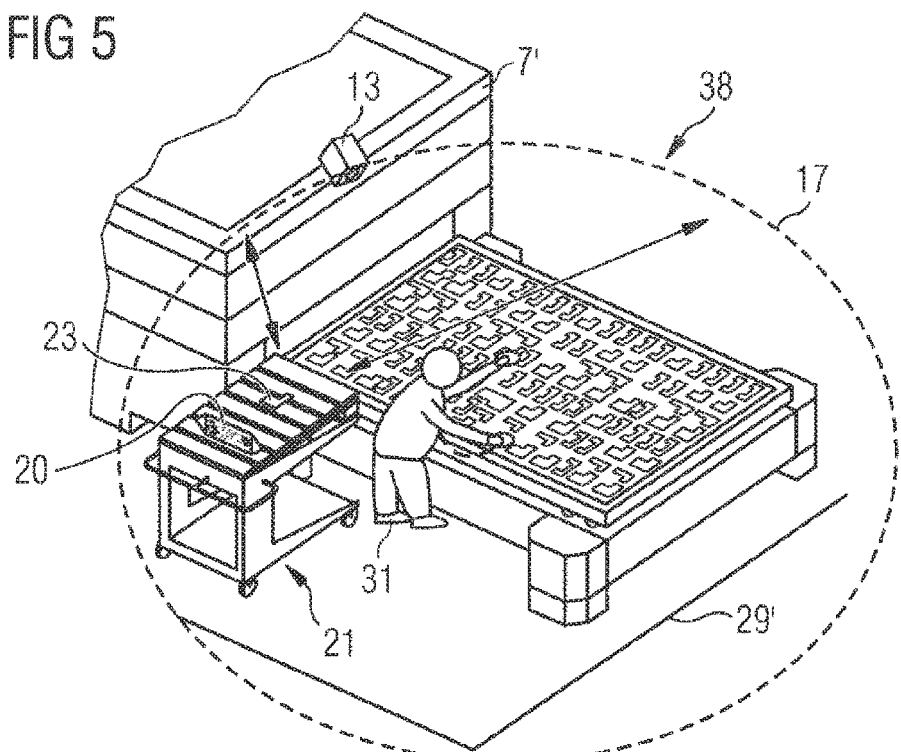
FIG. 5 shows an exemplary representation of a machine tool integrated into an image acquisition device-based tracking system.

To illustrate the first assigning step, FIG. 5 shows a sorting process in which an operator 31 sorts/deposits the cut material of a laser cutting machine 7 on the transport carriage 21. A mobile unit 20 was activated according to a specific order (processing plan assignment) and spatially assigned to the workpieces 23. For example, after the sorting process has been completed, operator 31 activates a button on the mobile unit 20 so that the manufacturing control system is informed that the sorting process was completed. In an image of the image acquisition device 13, an object feature for an object to be tracked is now defined, e.g., a specific shape of the workpiece 23 or a specific color of an LED on the mobile unit 20. Thus, the analysis unit 11 knows at which position in the image the object (transport carriage/workpiece) can be found. If the object moves across several observation zones, a transfer can be carried out, for example, according to the concepts disclosed herein.

When the sorting process is completed and the workpieces are pushed to the next processing process, this can be detected by passing a gate 29' and forwarded to the manufacturing control system.

The first assignment step can be supported by an assistance system 38 provided on a machine tool 7 or more generally at a workstation.

FIG. 5 shows a machine tool 7' with an optical assistance system 38, which is based on image data acquisition with an image acquisition device 13 and supports the assignment of a workpiece as an object to be tracked.

In assisted spatial assignment, image acquisition device 13 recognizes a sorted workpiece 23 and generates a measurement assistance workpiece data set 38A (see also FIG. 1). The measuring assistance workpiece data set 38A is compared with geometry data sets 37A of the processing plans 37 in the manufacturing control system 1 to identify the processing plan 37 that belongs to the detected workpiece.

Figure 6:
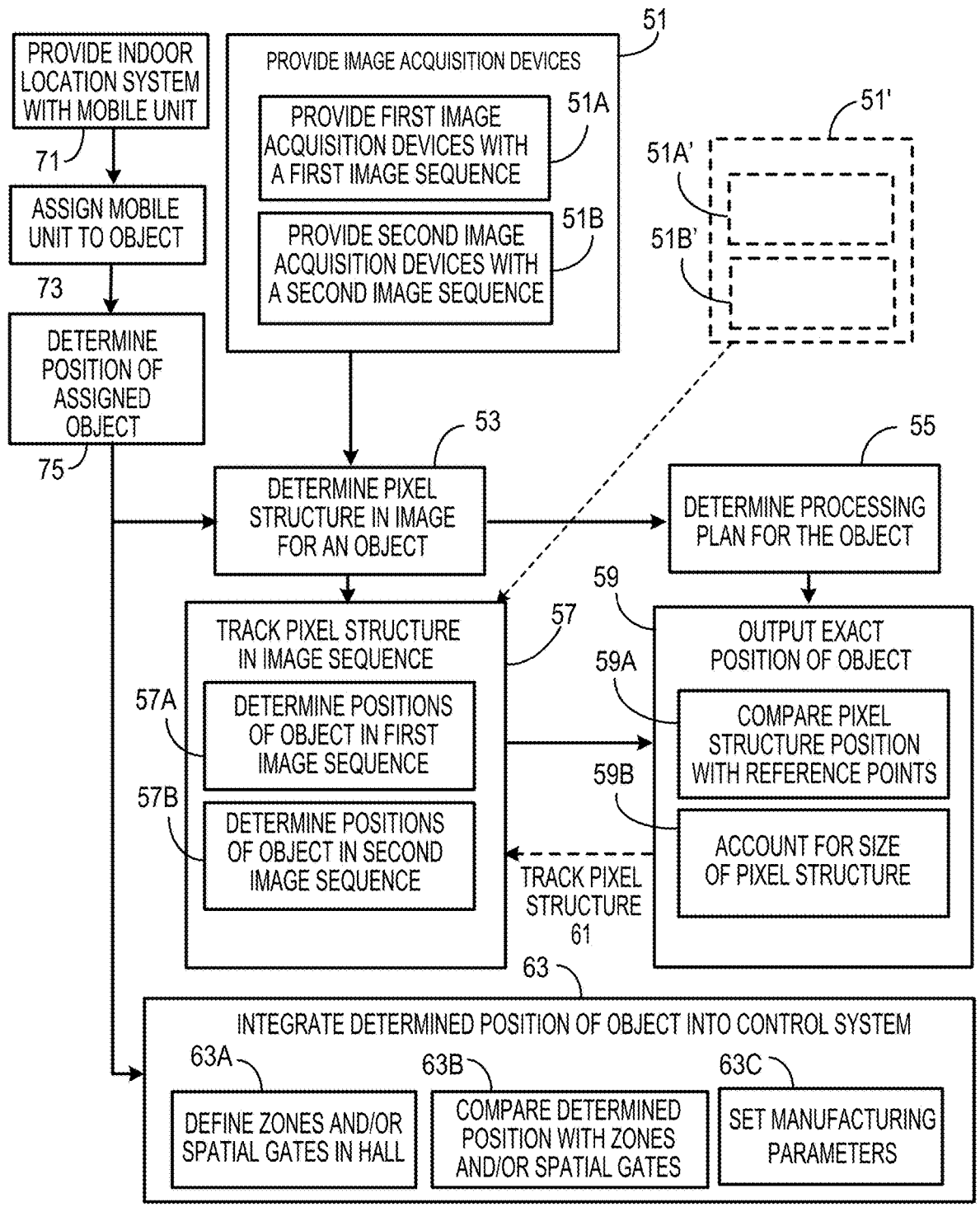
FIG. 6 shows a flow chart to illustrate a manufacturing process supported by an image acquisition device-based tracking system.

The integration of the manufacturing supported by an image acquisition device-based tracking system described herein is explained in summary in connection with FIG. 6. Reference is made additionally to FIGS. 1 to 5.

FIG. 6 shows exemplary method steps of a method for the manufacturing control of process courses in the industrial processing of workpieces 23, whereby the method is supported by an image acquisition device-based tracking system. For the method, image acquisition devices are provided for an image acquisition device-based tracking system (step 51). Each image acquisition device is allocated to an observation area and preferably delivers continuous image sequences to a common analysis unit. As an example, a first image acquisition device with a first image sequence (step 51A) and a second image acquisition device with a second image sequence (step 51B) are indicated in FIG. 6.

To illustrate a modular structure, further image sequences can be generated that are assigned to the same or another analysis unit (step 51' with steps 51A', 51B').

Based on an image from one of the image sequences, an assignment procedure is carried out in which a pixel structure is determined in the image for an object to be tracked (step 53). For this, the object to be tracked is identified, e.g., in the first image, using at least one object feature that is present as a pixel structure in the pixels of the first image. For example, the object to be tracked is identified in a first image of the first image sequence whose observation area is allocated to a sorting process.

The choice of the object feature to be used as a pixel structure of tracking the movement of the object in the manufacturing hall can take into account, for example, the color and/or geometric shapes stored in a processing plan of a workpiece, for example. The object feature can also be a light signal from an LED or an extent of a homogeneous pixel value range in the image. The identifying of the object to be tracked in the first image can be done with a software system that provides information about the position of the object in the first image, especially by using an object information area superimposed on the observation area.

The corresponding processing plan is also determined for the object to be tracked (step 55).

The tracking (step 57) of the pixel structure in images 39 of the image sequences 41 can now be performed using simple algorithms and without the need for complex object recognition. First, the positions of the object feature in images 39 of the first image sequence 41, which were taken temporally after the first image, are determined (step 57A).

An object to be tracked can leave the observation area of the first image acquisition device. In this case, in a step 57B one determines the positions of the object feature in images of the second image sequence. The localizing of the object feature involves, for example, determining an object feature vector that describes the movement of the object feature between images in the first of the image sequences. The object feature vector can be a direction vector or a velocity vector of the pixel structure. These can refer to the movement in the image or to the movement in space, e.g., in the manufacturing hall. The object feature vector can be projected into an image of the second of the image sequences to continue the tracking of the pixel structure, which can need to be adjusted for the second image sequence due to observation direction etc.

In general, when an object feature leaves an observation area in the manufacturing hall allocated to image sequence 39, suitable analytics tools and routines check whether an object feature corresponding to the object feature and/or object feature vector can be identified in a suitable location/time window of another image sequence with sufficiently high probability.

As indicated in FIG. 4, observation areas of image sequences 39 can overlap (overlap area 17') and a transfer of object features from the first image sequence to the second image sequence can be performed using pixel values in the overlap area 17' of essentially simultaneous images.

If an exact position of the object to be tracked is to be output (step 59), the position of the pixel structure in a current image is projected onto the allocated observation area. For this, for example, a comparison with reference points can be made (step 59A), or a corresponding size of the pixel structure can be taken into account (step 59B) etc. One can also access data from the processing plan that belongs to the object.

Information from the process of determining the current position can be used in the tracking of the pixel structure in the context of self-learning machines (machine learning) (dashed arrow 61).

The determined position of the object is now integrated into the control system of the industrial manufacturing plant for the production of the end product (step 63). Depending on the object, position information of a tool, a person, a device of transport, a machine tool, and/or a workpiece collection point unit is thus available for the control of the industrial manufacturing plant.

The integration into the control of the industrial manufacturing plant can, for example, include a definition (step 63A) of zones 27 and/or spatial gates 29 in the manufacturing hall, such as in a site plan 25, 25' of the manufacturing hall, and a comparison (step 63B) of the determined position with respect to the zones 27 and/or the spatial gates 29.

In the site plan of the manufacturing hall, a zone (machine tool zone) can be created around machine tools/processing stations, for example, around the bending machine, in step 63A. This zone can be defined as a volume body (3D zone), which for example reaches up to a height of 1.5 m above the hall floor. If a transport carriage with workpieces as objects to be tracked, which belong to a single order, is pushed into this zone, the manufacturing control system registers this in step 63B.

The support of the manufacturing control of process courses can include the integration possibilities discussed herein. For example, signals can be generated by a signal output device of the mobile unit 20, e.g., a display unit 17, an LED, or a loudspeaker.

The support of the manufacturing control of process courses via the manufacturing control system 1 can control machining parameters on the machine tools 7 or generally set manufacturing parameters (step 63C), which can also relate to the manufacturing hall or to a subsequent data analysis, for example.

As a further example of an integration into the manufacturing control, the manufacturing control system can register the respective processing order at the processing station (e.g., on the bending machine) using the digital assignment of step 55. Further secondary actions can also be initiated automatically. In this way a respective processing program can be automatically loaded in the machine tool. This can allow the machine tool (for example a bending machine) to be automatically set up via a Tool-Master. On an allocated screen, an operator can be shown information necessary for the upcoming machining process (work step). For example, an image of the original shape of the workpiece as well as the bent shape of the workpiece, the number of workpieces to be bent, and/or the subsequent machining process, etc., can be displayed.

An advantage when processing in connection with defined zones and gates is that the operator does not have to do anything more than to bring the tracked objects into a zone of a machine tool, which automatically initiates the various preparatory actions. As already mentioned, the machine tool can, for example, be immediately and automatically adjusted to the new order to be processed. This can save considerable time and errors can be avoided.

When a mobile unit interacts with the manufacturing control system or when an operator activates additional functions (input keys, etc.) of a mobile unit, the operator can receive feedback or messages from the mobile units via output means such as RGB LED, vibration, displayed text, or sound. For example, the status of an order can be visualized, for example by having an LED light up green as long as the order is in the processing state. Feedback or a message can be given to subsequent processing stations. For example, the automatic booking of a completed processing procedure can alert the subsequent process that the parts are now ready and where they are located. In general, triggering actions such as booking via zones can be further enhanced, so that, for example, workpieces can be monitored over time during the various processing procedures.

Mobile units can also be part of an indoor location system that supports image-based tracking. FIG. 6 illustrates this with steps 71 to 75. Step 71 involves providing the indoor location system having a plurality of transceiver units permanently installed in the manufacturing hall, at least one mobile unit, and one analysis unit, the transceiver units and the mobile unit being configured to transmit and receive electromagnetic signals and the analysis unit being configured to determine the positions of the mobile unit in the manufacturing hall from runtimes of the electromagnetic signals between the transceiver units and the mobile unit. Assigning (step 73) the mobile unit to at least one object (15, 21, 23, 31) to be tracked. Determining (step 75) the position of the at least one assigned object (15, 21, 23, 31) by localizing the assigned mobile unit with the indoor location system. Including (step 63) the determined position into the assignment process, in which a pixel structure is determined in the image for an object to be tracked (step 53), and/or into the manufacturing control of the industrial manufacturing plant for the manufacture of the end product into the image acquisition device-based tracking.

The UWB-based location systems disclosed herein, intended for integration into industrial manufacturing, are based on mobile units (often referred to as "tags") and stationary transceivers (often referred to as "Anker" or "anchors"). When integrated into industrial manufacturing, a workpiece, generally an object ("assets"), can be provided with at least one mobile unit to determine its position, or it can be functionally or spatially related to it (also referred to herein as physical or spatial assignment). The mobile units are generally electronic components capable of communicating with the transceiver equipment by UWB communication technology. Each mobile unit can have its own time determination unit ("clock") for determining runtimes.

Spatial assignment can be carried out by positioning a mobile unit close to an assigned workpiece or on the workpiece itself, or by depositing the workpiece on a workpiece collection point unit on which a mobile unit is provided, for example a transport carriage, a collection container, or a pallet. The mobile unit can be permanently attached there (or to a person) or can be attachable to or be placed on the workpiece/workpiece collection point unit. For attaching, the mobile unit can, for example, have a holding mechanism, such as a magnet or a clamping, screwing, clipping, bayonet or suction device, with which it can be connected to the workpiece or to the workpiece collection point unit in such a way that it cannot detach from the latter in an uncontrolled manner.

In addition to the spatial assignment of, for example, a workpiece to the mobile unit, an assignment of the mobile unit (and thus of the spatially assigned workpiece) to the respective manufacturing order of the workpiece can also be made (also referred to herein as digital assignment of the manufacturing process or processing plan assignment for short).

The use of a UWB-based location system can be the starting point for location-based information processing. The location system can optionally be equipped with further sensor technology, for example with acceleration and/or orientation sensors, and thus also serve as a starting point for orientation-dependent information processing. This enables a position (and, if necessary, orientation) dependent interaction within the UWB-based location system during manufacturing control as well as an optimization of manufacturing processes. For example, virtual gates (gates) and zones can also be used to automatically monitor and control a manufacturing process and subsequent production steps. This can be done in real time.

The UWB-based location system can have several transceiver units and at least one mobile unit. The location system can also interact with the MES 3. For example, a UWB analysis unit of the UWB-based location system can be configured as part of the MES 3.

The transceiver units can be set up to send UWB radio signals to the mobile units and receive UWB radio signals from them. The transceiver units can be distributed throughout the manufacturing hall to ensure sufficient coverage of the manufacturing hall, for example, similar to the image acquisition devices 13.

The distance between a spatially mobile unit and, for example, a permanently installed transceiver unit, can be determined by the time it takes for the signal to travel the distance between the two units. If the distances of several transceiver units whose location is known in each case are determined, the spatial location of the mobile unit in relation to the transceiver units can be determined, e.g., by triangulation.

For a determination of the runtime, the transceiver unit and the mobile unit(s) can have highly accurate clocks that can determine the time to a few or even only fractions of ns. Even if the clocks in the transceiver unit and in the mobile unit are highly accurate, the clocks are not necessarily synchronized yet. Different methods of synchronizing clocks or eliminating errors following from the asynchronous clock operation can be used. For example, one of the transceiver units can send a signal at a first time T1 and a second signal at a second time T2. The mobile unit can know the time difference T2−T1 or it can be transmitted together with the signals so that it can synchronize to the time of the transceiver units. Alternatively, the mobile unit can send two signals at a previously known time interval Ta. In this case, the transceiver unit can use its own time measurement with its own clock from the reception of the first signal to the reception of the second signal to determine the synchronization deviation and remove it from the distance measurement. The time interval between the first signal and the second signal should be short, so that the mobile unit has not moved significantly during this time. The time interval can be selected by the mobile unit to be a predetermined multiple or fraction of the time that the mobile unit requires from the reception of a signal to which it is to respond until the output of the first signal.

With the combined use of the image-based tracking disclosed herein and an e.g., UWB-based indoor location system, the tracking and localizing can be used in a smooth transition. For example, in the case of a smooth transition between UWB-localizing (tracking) and image-based tracking (camera tracking), an area that is difficult for an optical system to access (e.g., due to unfavorable lighting conditions, an angled building, etc.) or a sensitive area (e.g., inadmissible due to personal surveillance) can be subject to UWB technology. In suitable rooms of the manufacturing plant with good optical conditions, for example in the area of the exit gates and entrance gates e.g., for incoming goods, image-based tracking can be provided.

The manufacturing control can provide additional information that is taken into account in image-based tracking. If, for example, a semi-finished product changes during a manufacturing process, e.g., from a 2D shape, to a bent part and to a welded assembly, this information can be made available to image-based tracking on the basis of processing plan data. This can facilitate optical detection. Image-based tracking can provide additional information that can be taken into account in manufacturing control. This can be used especially in quality assurance. Assuming that a resulting shape of a workpiece deviates significantly from the expected shape or that features are obviously missing, this can be detected visually and communicated to the manufacturing control system. Image-based tracking can be used to determine whether a workpiece or assembly is primed or painted or has undergone any other (e.g., in the visible frequency range) recognizable surface processing. Similarly, in the case of image recognition in the IR frequency range, for example, a specific temperature distribution or a temperature curve over time can be recorded and communicated to the manufacturing control system.

It is also possible to trigger events or display upcoming events based on the number of tracked objects located in one or more zones. For example, picking processes or transfer tasks can be triggered.

In addition to stationary zones, zones can also move dynamically with one or more objects. This allows, for example, the transport of several load carriers (transport carriages), and the orders carried along can be treated together as a cluster by the manufacturing control system.

In addition, an object can be processed on a hand tool, for example, and image acquisition device-based tracking can be used to determine when and/or how the hand tool is used.

Via tracking tools, it is also possible to detect the movement of the tool. This can be used to generate information on how many components have been processed or whether a processing step was forgotten, etc.

In addition, further data can be transmitted via the image acquisition device-based tracking system, for example error messages by corresponding movement patterns of an object, e.g., in a defined error zone.

Another usage scenario concerns the recording of process states that are characterized by the positions of workpieces, people, machines, and other operating resources and that can be captured by a cognitive evaluation of these measured positions. In general, the image acquisition device-based tracking data as well as the information regarding zones and gates allow a variety of evaluation possibilities. For example, it is possible to use such raw data to generate key performance indicators (KPIs) and to carry out detailed analyses to optimize manufacturing processes. These analyses (e.g., KPIs) can be presented in the form of "heat maps," as a live view or aggregated. Further evaluation diagrams such as spaghetti diagrams are thus immediately available for various processing operations. This makes it possible to make standard key figures, which often generate a great deal of effort during collection, available at the push of a button, such as lead time, value stream analysis, etc. In addition, the courses of the production can be improved on the basis of the location information obtained with the aid of numerical optimization methods.

The use of the image acquisition device-based tracking system also allows to localize persons or body parts of persons if they are identified as objects to be tracked. In addition to workpieces and tools, the localization of persons (as a whole or local localization of leg, arm and hand) provides valuable information about the courses of the production. Usage scenarios for this purpose concern, for example, the monitoring of safety-critical areas for the protection of persons, such as the operators. Movement patterns can be generated, which in turn can be evaluated e.g., for process or ergonomic improvement of operator workstations. The synchronous evaluation of both hands of a person, especially an operator or a worker, can provide detailed information about the manufacturing process and the workpiece. It can be recorded in this way that a worker has grasped at a position X; a worker has transported a specific workpiece from A to B; a worker has placed a specific workpiece at a position Y; a manufacturing process such as drilling or press-fitting has been carried out x times; a manufacturing process such as deburring or welding has been carried out on a specific trajectory on a workpiece; or a joining process was carried out at a specific position.

Different objects to be tracked can have specific relationships to each other. For example, they can be grouped into families as part of a specific manufacturing process to define basic (behavioral/movement) patterns. Families can, for example, be assigned to an order, an assembly, a subsequent process of workpieces, or a respective load carrier (transport carriage, pallet, or collection container). The family relation can be changed dynamically during the current course of processing. Objects can belong to different families at the same time. Families of objects can have a specific link, for example, all load carriers, all means of transport, all workers, all workpieces, all machines, etc., or a family of objects can relate to a specific status of the object, for example, a charging status of mobile units. Accordingly, the analysis, like the recording of process states, can be based on the evaluation of such families.

The extension of a manufacturing plant with an image acquisition device-based tracking disclosed herein and interfaces to the manufacturing control system can be used to determine the position of a workpiece collection point units and/or to record the movement of an operator's hand, for example with infrared imaging.

An operator who monitors and controls the course of the processing in a control center can see on his surveillance monitor where a specific order is currently in the process chain and what its status is at the moment. Accordingly, he can also directly access a display unit to adjust displayed data (workpiece information) such as preferences, processing steps, etc., and to display it to a local operator. Alternatively or in addition, this can also be done on site with an input device on the workpiece collection point unit (e.g., button, switch, touchpad) or via a data interface that gives an external e.g., mobile input unit (Smartphone, IPad, Smartwatch etc.) access. Accordingly, the workpiece collection point unit can have a near-field radio network (Bluetooth, NFC), for example. For example, the workpiece collection point unit is specifically controlled to activate the signal device (e.g., a brightly lit LED).

Image-based tracking can also be used for sorting, for example, by tracking the location of a hand (especially a glove that is clearly visible in images). If the "hand" of an operator removes a component from the remaining grid, the component location is booked from the remaining grid to the hand in the MES. If the hand moves near a workpiece collection point unit, the MES records that this part has been deposited at the corresponding workpiece collection point unit. On the one side, the tracking system can detect that the hand came close to the workpiece. On the other side, a higher-level system (e.g., the MES) can link the workpiece collection point unit and the position of the hand.

Figure 7:
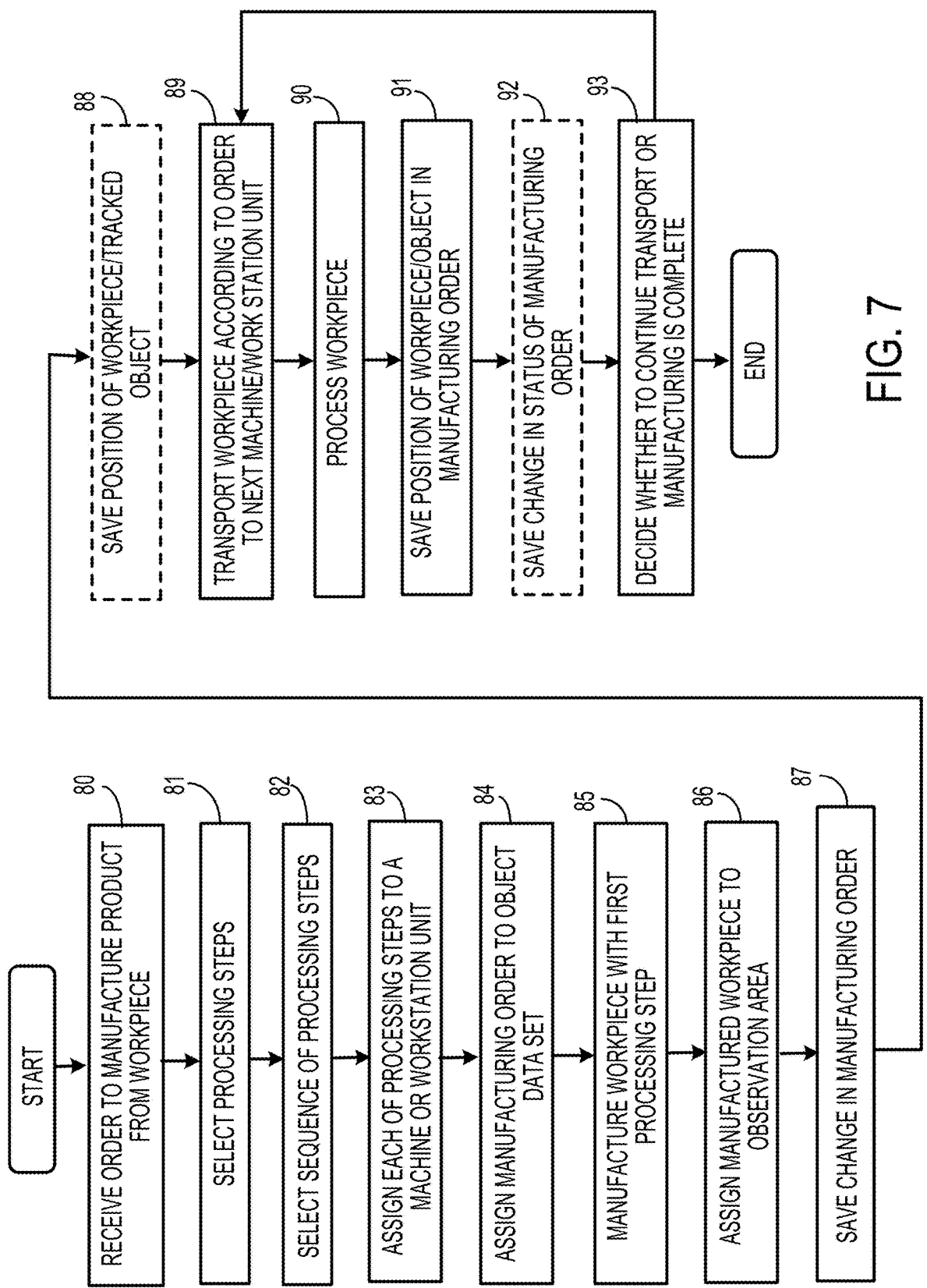
FIG. 7 shows a flow chart to illustrate method steps for the industrial manufacturing of an end product.

FIG. 7 shows exemplary method steps for industrial manufacturing of an end product, which can be carried out with a manufacturing control system such as the MES 3.

In a first step 80, a manufacturing order (with a processing plan 37) is received to manufacture an end product from a workpiece 23 with the MES 3, which is implemented in a data processing device 30A, for example. In a subsequent step 81, individual processing steps are selected by the MES 3, and in a further step 82, a sequence is selected by the MES 3 (or an operator) in which the processing steps are to be carried out. The processing steps can be one or more of the following: cutting (laser cutting), punching, bending, drilling, threading, grinding, joining, welding, riveting, screwing, pressing, treating the edges and surfaces.

In a further step 83, each of the processing steps is data-technically assigned, e.g., by computer automation, to a machine 7 or a workstation unit. The workstation unit can be a workstation 26 as described above, especially a manual workstation.

In a further step 84, the manufacturing order is data-technically assigned to an object data set to be tracked, which is stored in MES 3 for a mobile unit. This step 84 can correspond to step 53 shown in FIG. 6. Step 84 can be carried out earlier, e.g., after one or more of the method steps described above.

In a further step 85, a workpiece 23, which is at least partially a part of the end product, is manufactured after a first of the processing steps on the machine 7 or workstation unit assigned to this processing step. For example, a part of the manufacturing order is cut from a sheet metal. As milling or punching can also be necessary as a subsequent processing step, this workpiece 23 can include even more material than the end product, e.g., it can only partially form the end product or be a part of it.

In a further step 86, the spatial assignment of the manufactured workpiece 23 to a position in an observation area takes place. This step 86 can correspond to step 59 shown in FIG. 6. In a further step 87, a change in the status of the manufacturing order is saved in MES 3.

In an optional step 88, the position of the workpiece/tracked object is saved for the manufacturing order.

In a further step 89, the workpiece 23 is transported according to the manufacturing order to the next machine 7 or the next workstation unit in the predetermined sequence. This can be done as a result of an instruction of the MES 3 by a person or by an automated transport process.

In a further step 90, this processing step is performed at the machine 7 or workstation unit assigned to it.

In an optional step 91, the position of the workpiece/tracked object for this processing step is saved in the manufacturing order.

In a further step 92, a change in the status of the manufacturing order is saved again in MES 3.

In a further step 93, a decision is made as to whether to continue with method step 89, e.g., a transport to a further processing step, or whether the manufacturing is completed.

During these processing steps, the position of tracked objects can always be determined via the MES 3. This allows the MES 3 to have data such as current status data and current position data of the workpiece 23 at any time. MES 3 and the image acquisition device-based tracking system 5 can be configured as described above.

All the above described method steps, which are carried out by a manufacturing control, a manufacturing control system, an image acquisition device-based tracking system, or by the MES 3, can also be implemented by one or more data processing devices having means for carrying out the method steps.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, as limits of value ranges.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A method of manufacturing control of processing of workpieces according to processing plans in a manufacturing hall for the manufacture of an end product, the method comprising:

providing in the manufacturing hall a plurality of image acquisition devices configured to acquire image sequences of allocated observation areas within the manufacturing hall;

identifying an object to be tracked in a first image of the image sequences using at least one object feature in the first image;

determining a processing plan that relates to the object to be tracked;

determining positions of the object feature in image sequences acquired temporally after the first image;

determining a current position of the object to be tracked by localizing the object feature in a temporally current image of one of the image sequences and assigning the current position of the object feature in the temporally current image to a current position within the observation area of the image sequence that includes the temporally current image; and integrating the determined current position of the object to be tracked into a manufacturing control of the manufacturing hall for manufacturing the end product.

2. The method of claim 1, wherein the determined current position of the object to be tracked is integrated into the manufacturing control by using the determined processing plan.

3. The method of claim 1, wherein the object to be tracked is tracked within the images on the basis of pixel changes associated with an object feature.

4. The method of claim 1, wherein the object to be tracked in the first image is identified with a software system.

5. The method of claim 1, wherein localizing the object feature comprises:
   determining an object feature vector describing a movement of the object feature between images of the first image sequence; and
   projecting the object feature vector into an image of a second of the image sequences.

6. The method of claim 5, further comprising, when the object leaves an observation area within the manufacturing hall, checking whether a new object feature that corresponds to the object feature and the object feature vector, can be identified in a further image sequence.

7. The method of claim 5, wherein the object feature vector is a direction vector or a velocity vector.

8. The method of claim 5, wherein the observation areas of the first image sequence and the second image sequence have an overlapping area and a hand-over of the object features from the first image sequence to the second image sequence takes place on the basis of pixel values in the overlapping area of images at approximately the same point in time.

9. The method of claim 1, wherein the object to be tracked is a workpiece, a transport device, a tool, a mobile unit, or a person.

10. The method of claim 1, wherein the image sequences of the image acquisition devices have a unique time reference for determining position with respect to each other.

11. The method of claim 1, wherein the object feature includes a specific geometric shape, a color, a light signal, or an extension of an area in the image.

12. The method of claim 1, wherein assigning of the position of the object feature in the temporally current image to a current position within the observation area of the image sequence comprises:
   providing reference points in the observation areas, and
   calculating an exact location and point in time of the object to be tracked using at least one of the reference points.

13. The method of claim 1, further comprising:
   providing the determined current position of the object to be tracked via a suitable interface, and
   integrating the determined current position of the object to be tracked in a motion analysis of the object to be tracked.

14. The method of claim 1, further comprising:
   defining one or both of zones and spatial gates in the manufacturing hall, and
   comparing the determined current position of the object to be tracked with respect to the zones, spatial gates, or both the zones and the spatial gates and controlling the manufacturing based on the comparison.

15. The method of claim 14, wherein comparing the determined current position of the object to be tracked results in the object to be tracked being located in a zone or having left the zone or having passed a spatial gate.

16. The method of claim 1, wherein integrating the determined current position of the object to be tracked comprises one or more of:
   outputting signals to support localizing the object to be tracked;
   displaying information on one or both of the determined current position and the manufacturing status of the object to be tracked;
   setting operating parameters of a machine tool;
   updating a log that logs the processing steps; or
   assigning the object to be tracked to an order for the manufacturing of one or more end products in several different processing steps.

17. The method of claim 1, wherein the object to be tracked is a workpiece and integrating the determined current position of the object to be tracked comprises controlling or monitoring or both controlling and monitoring:
   processing of the workpiece in several different processing steps that are carried out at different locations; or
   transporting of the workpiece between different processing steps that are carried out at different locations.

18. The method of claim 1, wherein the manufacturing control system is supported by an indoor localization method comprising:
   providing an indoor location system having a plurality of transceiver units installed in the manufacturing hall, at least one mobile unit, and a localization analysis unit, the transceiver units and the mobile unit being configured for transmitting and receiving electromagnetic signals and the localization analysis unit being configured to determine the positions of the mobile unit in the manufacturing hall from runtimes of the electromagnetic signals between the transceiver units and the mobile unit;
   assigning the mobile unit to the object to be tracked;
   determining the position of the assigned object by localizing the assigned mobile unit with the indoor location system; and
   integrating the determined position into one or both of
   (i) an allocation process, in which a pixel structure is determined in the image for the object to be tracked, or
   (ii) the manufacturing control for manufacturing the end product.

19. A manufacturing control system for controlling manufacturing processes in a manufacturing hall, comprising:
   a plurality of image acquisition devices installed in the manufacturing hall and configured to acquire image sequences of allocated observation areas within the manufacturing hall; and
   an analysis unit configured to determine, exchange, and provide data on the position of an object to be tracked in the manufacturing hall and to perform a method comprising:
   identifying an object to be tracked in a first image of the image sequences using at least one object feature in the first image;
   determining a processing plan that relates to the object to be tracked;
   determining positions of the object feature in image sequences acquired temporally after the first image;
   determining a current position of the object to be tracked by localizing the object feature in a temporally current image of one of the image sequences and assigning the current position of the object feature in the temporally current image to a current position within the observation area of the image sequence that includes the temporally current image; and
   integrating the determined current position of the object to be tracked into a manufacturing control of the manufacturing hall for manufacturing the end product.

20. The manufacturing control system of claim 19, further comprising a display unit configured to display the observation areas, a position of the object to be tracked, and at least one mobile unit in a site plan of the manufacturing hall, wherein at least one of the image acquisition devices acquires images in one or both of the visible light range and the non-visible light range.

21. The manufacturing control system of claim 19, further comprising an indoor location system with a plurality of transmitting and receiving units installed in the manufacturing hall, at least one mobile unit, and at least one analysis unit, wherein the transmitting and receiving units and the mobile unit are configured for transmitting and receiving electromagnetic signals, and wherein the at least one analysis unit is configured to determine the position of the mobile units from runtimes of the electromagnetic signals between the transmitting and receiving units and the mobile unit, and the position of the object to be tracked in the manufacturing hall, wherein the object to be tracked is assigned to the mobile unit.

22. A method for industrial manufacturing of an end product in a manufacturing hall using a manufacturing control system, the method comprising:

receiving a manufacturing order for manufacturing an end product from a workpiece with a machine control system (MES) of the manufacturing control system implemented in a data processing device;

selecting individual processing steps with the MES;

determining an order of the processing steps with the MES, wherein the processing steps include one or more of cutting, cutting, punching, bending, drilling, threading, grinding, joining, welding, riveting, screwing, pressing, treating edges, or treating surfaces;

assigning the manufacturing steps to a machine or a workstation unit;

assigning the manufacturing order to an object to be tracked in the MES;

manufacturing a workpiece by processing the workpiece into a part of the end product after a first of the processing steps on the machine or workstation unit assigned to the processing step;

storing a status change of the manufacturing order in the MES;

transporting the manufactured workpiece to the next machine or workstation unit in the predetermined steps;

performing the processing step on the next machine or workstation unit;

storing a status change of the manufacturing order in the MES; and performing the processing steps of the manufacturing order with the MES, wherein the position of the object to be tracked is determined by:

providing in the manufacturing hall a plurality of image acquisition devices configured to acquire image sequences of allocated observation areas within the manufacturing hall;

identifying the object to be tracked in a first image of the image sequences using at least one object feature in the first image;

determining a processing plan that relates to the object to be tracked;

determining positions of the object feature in image sequences acquired temporally after the first image; and determining a current position of the object to be tracked by localizing the object feature in a temporally current image of one of the image sequences and assigning the current position of the object feature in the temporally current image to a current position within the observation area of the image sequence that includes the temporally current image, such that the MES has at any time data on the current status and current position of the object to be tracked for integrating the determined current position of the object to be tracked into a manufacturing control for manufacturing the end product.

\* \* \* \* \*